March 4, 1958
R. H. FARQUHAR
2,825,151
DEVICE FOR INDICATING THE RELATIVE MOVEMENT
OF THE EARTH AND A HEAVENLY BODY
Filed Jan. 8, 1957
2 Sheets-Sheet 2
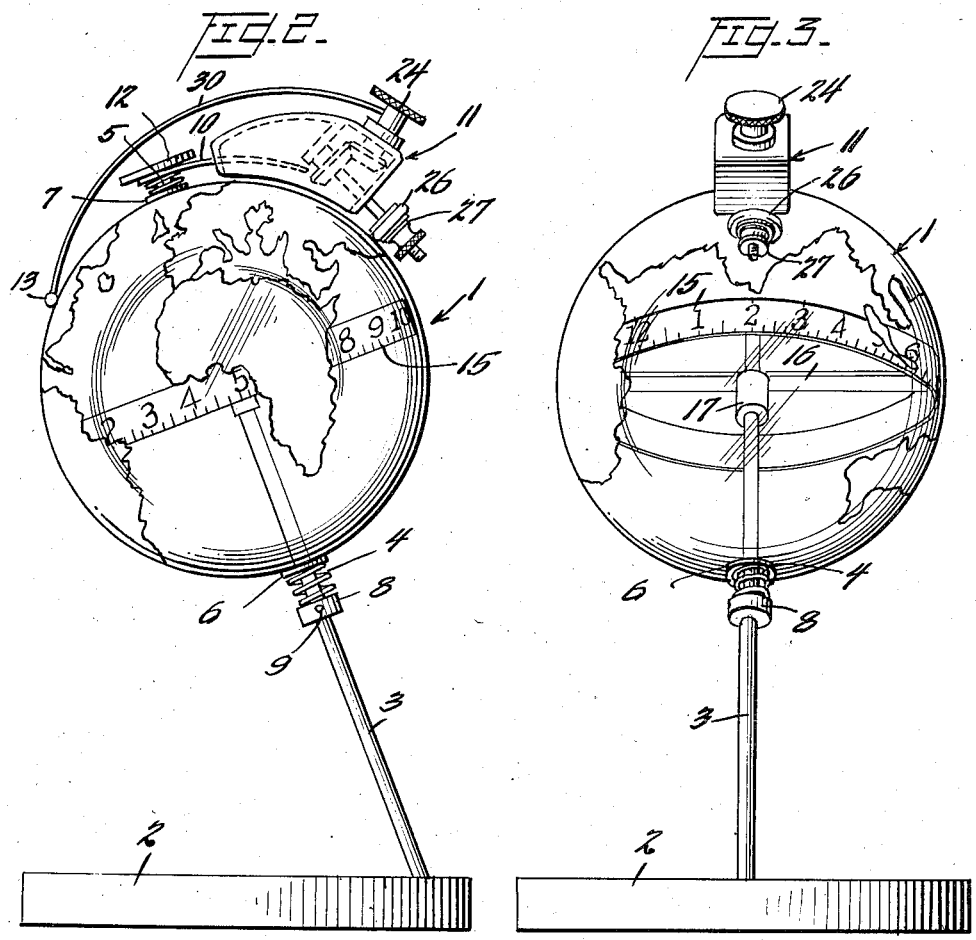
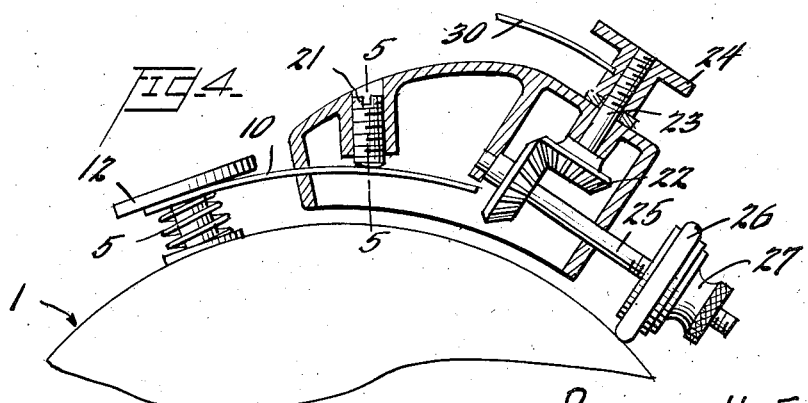
INVENTOR
Robert H. Farquhar
BY Watson, Cole, Grindle + Watson
ATTORNEY

United States Patent Office 2,825,151
Patented Mar. 4, 1958

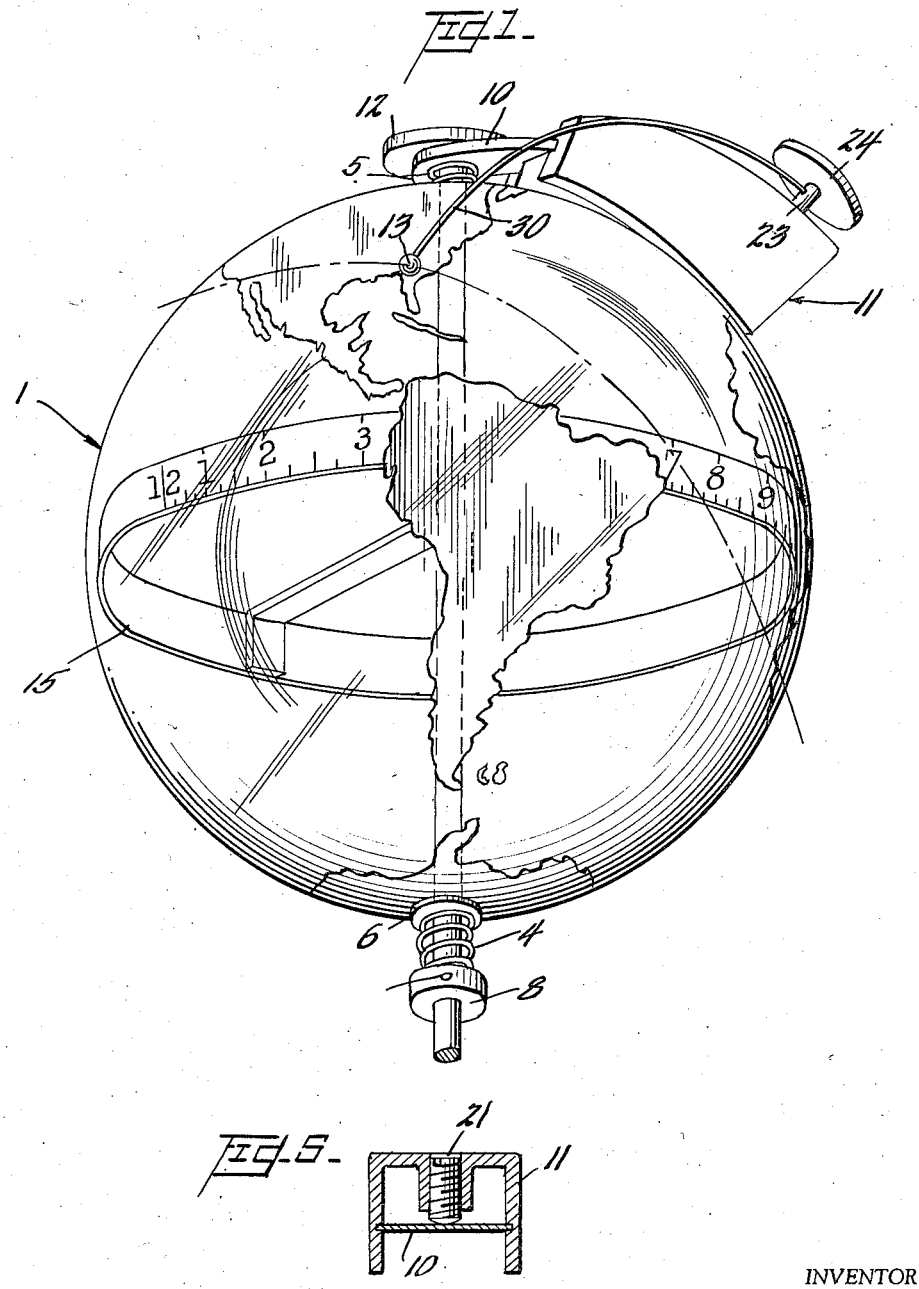

2,825,151

DEVICE FOR INDICATING THE RELATIVE MOVEMENT OF THE EARTH AND A HEAVENLY BODY

Robert H. Farquhar, Philadelphia, Pa.

Application January 8, 1957, Serial No. 633,017

8 Claims. (Cl. 35—43)

This invention relates to an educational device for displaying the relative association of the earth and a heavenly body, and in particular the orbital path to be followed by the proposed man-made earth satellite relative the earth.

The prior art is prolific in instructional apparatus showing the movements and positions of the earth, stars, and other heavenly bodies with respect to the sun. Additionally, other educational devices are known employing terrestrial globes in conjunction with mechanisms which drive associated bodies representative of the moon, earth circling aircraft, etc.

With the recent programs of research and development undertaken by the United States and other foreign governments and directed to the launching of an earth satellite which is to follow an orbit encircling the earth, considerable interest exists for devices which are useful in educating not only the scientists engaged in the foregoing programs but also students and other persons in the proposed relationship of the satellite to the earth.

Accordingly, a principle object of this invention is to provide a device which is useful for educational and scientific purposes and representing in an easily understandable manner the physical association of the earth satellite with respect to the earth.

Another object of this invention is to provide apparatus for showing the approximate relative position and movement of the earth satellite to the earth for any given time.

Another object of this invention is to provide improved apparatus which is reliable in operation and which may be economically and easily fabricated to show the movement of one heavenly body relative another heavenly body.

A preferred embodiment of this invention comprises a transparent terrestrial globe which is representative of the earth and a bead which is representative of the proposed earth satellite movable relative the globe. The globe is mounted on a base by means of a shaft which passes through the earth's axis of the rotation in such a manner that the earth is rotatable relative the shaft. A supporting frame is mounted on one end of the foregoing shaft which carries the gearing assembly for driving the satellite bead at the desired rotational speed and direction relative the globe. The globe is also coupled to the gearing assembly for movement. The gearing is so arranged that the satellite bead follows a great circle path in a southeasterly direction making a complete revolution about the earth while the earth rotates 22½°. This mode of movement corresponds generally with the proposed orbital path for the satellite.

In a second feature a stationary time ring is mounted on the shaft whereby the position of the satellite with respect to the earth's surface may be determined for any desired local time at the satellite launching station.

In order that all of the features for attaining the objects of this invention may be readily understood, reference is herein made to the accompanying drawings wherein:

Figure 1 is a view showing the general disposition of the terrestrial globe, satellite bead, time ring, and gearing mechanism of a preferred embodiment of this invention;

Figure 2 is a view of the structure of Figure 1 mounted on a support base and showing a side view of the gear box;

Figure 3 is a side view of the structure shown in Figure 2 and showing an end view of the gear box;

Figure 4 is a detailed longitudinal sectional view of the gearing mechanism for rotating the globe and satellite bead relative one another; and Figure 5 is a sectional view taken along line 5—5 of Figure 4.

Referring now to the preferred embodiment of the invention shown in the drawings, a transparent terrestrial globe 1 having a map of the earth's land surfaces printed thereon is shown mounted on a flat circular base 2 by means of a tilted shaft 3. Shaft 3 passes through the globe on the earth's axis of rotation as will be hereinafter outlined in detail and is loosely inserted in a mounting hole located in base 2. Globe 1 is movable both dependently and independently of the rotation of shaft 3.

Shaft 3 is tilted on base 2 merely to improve the ornamental presentation of the device of this invention. The axial position of globe 1 relative shaft 3 is fixed in the main by means of springs 4 and 5 which sandwitch globe 1 and are coaxially mounted on shaft 3. The axially aligned forces of springs 4 and 5 are applied to globe 1 through washers 6 and 7, respectively. The lower terminal end of spring 4 is maintained relative to shaft 3 by means of collar 8 which is fixedly mounted on shaft 3 and movable relative thereto by adjusting set screw 9. The upper terminal end of spring 5 contacts support arm 10.

Support arm 10 carries the gear box 11 and is sandwiched between spring 5 and the knob 12 which is fixed to the upper terminal end of shaft 3. The normal application of forces to globe 1 by means of springs 4 and 5 is such that the rotation of shaft 3 by the appropriate application of manual force to the shaft through knob 12 will also rotate globe 1 without loss of motion. Gear box 11 and its associated structure may also rotate in companionship with shaft 3. The rotation of shaft 3 is therefore operative in one condition to rotate the entire structure shown in the drawings with the exception of the supporting base.

A time ring 15 is positioned within the globe 1 and is fixed on shaft 3 by means of a cross arm 16 which supports the time ring 15 at diametrically opposed portions of the ring. The centermost portion of the cross arm 16 is coupled to a collar 17 which is fixed with respect to shaft 3 by means of a set screw (not shown). The time ring is subdivided into 24 main subdivisions which are representative of the hours of the day and in a preferred embodiment the ring is divided into two halves, one-half of which contains a white background for black numerals and the other half of which contains a black background for white numerals ranging from 1 to 12. The white background is preferably indicative of the p. m. hours and the black background is indicative of a. m. hours. If desired, the time ring may also be subdivided into fractional one-half and quarter-hour time intervals. Inasmuch as the time ring is fixed to shaft 3, rotation of this shaft by means of a manual force applied to knob 12 also produces a corresponding rotation of the time ring.

Axial movement of globe 1 with respect to shaft 3, so that changes in the relative position of the globe and the time ring can be obtained, is provided by the manual depressing of the globe causing spring 4 to contract. This operation reduces the friction drive between shaft 3 and globe 1 whereby the globe may be rotated manually and independently of shaft 3.

Bevel gear 22 translates the motion manually applied to shaft 23 by knob 24 into a rotation of shaft 25 which is at an approximate right angle to shaft 23. The end portion of shaft 25 projecting from gear box 11 is threaded whereby friction wheel 26 may be adjusted by means of thumb screw 27. In operation, friction wheel 26 engages the outer surface of globe 1 whereby the globe is rotated in response to a manually rotating force applied to knob 24. The particular setting of friction wheel 26 relative the axial length of shaft 23 is determined so that the proper relationship is maintained between rotational movements of the globe and the time required for the satellite bead 13 to complete a great circle path around the globe.

Present information indicates that the satellite is to follow an approximate great circle path around the earth which will take approximately 90 minutes to complete. Accordingly, the gearing including friction wheel 26 is adjusted so that the earth advances on its rotational axis 22½° for a complete revolution of the satellite. It will be noted that 22½° is the angular distance the earth turns in 90 minutes.

Inasmuch as satellite bead 13 is coupled to shaft 23 by means of wire support 30, shaft 23 represents the axis or pole of rotation of the satellite. Accordingly, in order to display a proper relationship between the satellite and the earth, shaft 23 must be accurately positioned so as to be aligned with the axis of rotation for the satellite. The pole (shaft 23) of the satellite must, therefore, be perpendicular to the plane containing the path followed by the satellite. Likewise, the point at which a projection from shaft 23 intersects the earth's surface must be situated 90 angular degrees as measured from the center of the earth from the circle scribed on the earth by the satellite.

A detailed description of the latching of the satellite from a specified location and at a required time is as follows:

With a random position of globe 1 and satellite bead 13 with respect to shaft 3, globe 1 is manually depressed so as to cause spring 4 to contract. The lowering of globe 1 on the longitudinal axis of shaft 3 removes the globe from frictional contact with wheel 26 whereby the globe may be moved independently of the satellite bead and without rotating the shaft.

Thereafter assuming that the satellite is to be launched from a site in Florida at 10:00 a. m., the globe is appropriately rotated independently of shaft 3 so that the meridian of the launching site in Florida projects across the 10:00 a. m. scale marking on time ring 15. With this positioning of the globe relative the time ring, and with the globe depressed in opposition to spring 4, support arm 11 and knob 24 are both appropriately rotated relative the globe and shaft 23 so that the satellite is superimposed over the launching station. With this occurrence the manual force applied to globe 1 to depress spring 4 is released so that friction wheel 26 again contacts the globe.

Assuming that friction wheel 26 is adjusted axially with respect to shaft 25 so that the satellite makes one complete revolution for each 22½° in the earth's rotation, manual rotation of knob 24 so that the satellite follows a generally southeasterly path from Florida will portray the movement of the satellite relative the earth.

The local time at the launching site for any particular orbital position of the satellite adjacent the earth may be determined by momentarily stopping the driving force applied to knob 24 and projecting the meridian of the launching site to the time ring for a time reading.

It is to be understood that the above-described arrangement is illustrative of the application of the principles of this invention. Numerous other arrangements may be devised by those skilled in the art without departing from the scope of the invention.

Having thus described my invention, what is claimed as new and desired to be secured by Letters Patent is:

1. A device for indicating the approximate relative movements and positions of the earth and the earth satellite comprising a transparent terrestrial globe representative of the earth, a base, a shaft passing through the globe coaxial with the earth's axis of rotation and formed with a knob at one terminal end and with the other terminal end engaging the base for support, a time ring positioned within the globe and fixed to the shaft, a pair of springs coaxial with the shaft and sandwiching the globe therebetween whereby the globe may be moved axially and rotated independently of said shaft by compressing either of the springs, a gear box, an arm coupled to said shaft above said globe and carrying said box in a fixed position relative said shaft or relatively rotatable therewith in response to the compression of either of the springs, a second shaft carried by said box for independent rotation and aligned with the pole and axis of rotation of the satellite, a bead representative of the satellite, a satellite support arm coupling said second shaft to said satellite whereby said satellite is rotatable by said second shaft in a great circle path adjacent the outer surface of the globe and in a plane perpendicular to said second shaft, a knob fixed to one terminal end of said second shaft for rotating said shaft, a bevel gear fixed to the other terminal end of the second shaft, and a friction wheel engaging the outer surface of the globe and coupled to said bevel gear for drive in response to the application of a manual rotating force to said second shaft.

2. A device for indicating the approximate relative movements and positions of the earth and the earth satellite comprising a terrestrial globe representative of the earth, a shaft passing through the globe coaxial with the earth's axis of rotation, a time ring positioned adjacent the globe, a gear box, an arm coupled to said shaft and supporting said gear box, a second shaft carried by said box for independent rotation and aligned with the pole and axis of rotation of the satellite, a bead representative of the satellite, a satellite support arm coupling said second shaft to said satellite whereby said satellite is rotatable by said second shaft in a great circle path adjacent the outer surface of the globe and in a plane perpendicular to said second shaft, a knob fixed to one terminal end of said second shaft for rotating said second shaft, a bevel gear fixed to the other terminal end of the second shaft, and a friction wheel engaging the outer surface of the globe and coupled to said bevel gear for drive in response to the application of a manual rotating force to said second shaft.

3. A device for indicating the approximate relative movements and positions of the earth and the earth satellite comprising a terrestrial globe representative of the earth, a shaft passing through the globe coaxial with the earth's axis of rotation, a time ring positioned adjacent the globe, a gear box, an arm coupled to said shaft and supporting said gear box, a second shaft carried by said box for independent rotation and aligned with the pole and axis of rotation of the satellite, a bead representative of the satellite, a satellite support arm coupling said second shaft to said satellite whereby said satellite is rotatable with said second shaft in a great circle path adjacent the outer surface of the globe and in a plane perpendicular to said shaft, means fixed to one terminal end of said second shaft for rotating said shaft, a bevel gear fixed to the other end of the second shaft, a third shaft coupled to the output of the bevel gear, a friction wheel engaging the outer surface of the globe and coupled to the third shaft for drive in response to the application of a manual rotating force to said second shaft.

4. A device for indicating the approximate relative movements and positions of the earth and the earth satellite comprising a terrestrial globe representative of the earth, a shaft passing through the globe coaxial with the earth's axis of rotation, a time ring positioned adjacent the globe, a gear box, an arm coupled to said shaft and supporting said gear box, a second shaft carried by said box for independent rotation and aligned with the pole and axis of rotation of the satellite, a bead representative of the satellite, a satellite support arm coupling said second shaft to said satellite whereby said satellite is rotatable with said shaft in a great circle path adjacent the outer surface of the globe and in a plane perpendicular to said shaft, means fixed to one terminal end of said second shaft for rotating said shaft, a gear mechanism fixed to the other end of the second shaft, a third shaft coupled to the output of the gear mechanism, a friction wheel engaging the outer surface of the globe and coupled to the third shaft for drive in response to the application of a manual rotating force to said second shaft, and means for varying the axial position of said friction wheel on said third shaft.

5. A device for indicating the approximate relative movements and positions of the earth and the earth satellite comprising a terrestrial globe representative of the earth, a shaft passing through the globe coaxial with the earth's axis of rotation, a gear frame, an arm coupled to said shaft and supporting said gear frame, a second shaft carried by said frame for independent rotation and aligned with the pole and axis of rotation of the satellite, a bead representative of the satellite, a satellite support arm coupling said second shaft to said satellite whereby said satellite is rotatable with said shaft in a path adjacent the outer surface of the globe and in a plane perpendicular to said shaft, means fixed to said second shaft for rotating said shaft, means fixed to said second shaft for translating the rotation thereof to an axis different than the longitudinal axis of said second shaft, a third shaft coupled to the output of the direction translating means, and a friction wheel engaging the outer surface of the globe and coupled to the third shaft for drive in response to the application of a manual rotating force to said second shaft.

6. A device for indicating the approximate relative movements and positions of the earth and the earth satellite comprising a terrestrial globe representative of the earth, a shaft passing through the globe coaxial with the earth's axis of rotation, a gear frame, an arm coupled to said shaft and supporting said gear frame, a second shaft carried by said frame for independent rotation and aligned with the pole and axis of rotation of the satellite, a bead representative of the satellite, a satellite support arm coupling said second shaft to said satellite whereby said satellite is rotatable with said shaft in a path adjacent the outer surface of the globe and in a plane perpendicular to said shaft, means fixed to said second shaft for rotating said shaft, means fixed to said second shaft for translating the axis of rotation thereof into a direction different than the longitudinal axis of said second shaft, a third shaft coupled to the output of the motion translating means, a friction wheel engaging the outer surface of the globe and coupled to the third shaft for drive in response to the application of a manual rotating force to said second shaft, and means for adjusting the axial position of said friction wheel on said third shaft.

7. A device for indicating the approximate relative movements and positions of the earth and an earth satellite comprising a terrestrial globe representative of the earth, means supporting the globe for rotation on the earth's axis of rotation, a gear frame, an arm coupled to said shaft and supporting said gear frame, satellite drive means carried by said frame for independent rotation and having an axis of rotation aligned with the pole and axis of rotation of the satellite, a bead representative of the satellite, a satellite support arm coupling said satellite drive means to said satellite whereby said satellite is rotatable with said drive means in a path adjacent the outer surface of the globe and in a plane perpendicular to said shaft, means coupled to said satellite drive means for translating the axis of rotation thereof into a direction different than the axis of rotation of said drive means, means driven by said motion translating means and coupled to said globe for rotating the globe on its axis of rotation in response to movements of the satellite bead relative the globe.

8. A device for indicating the approximate relative movements and positions of a heavenly body and a satellite thereto comprising a terrestrial globe representative of the heavenly body, means supporting the globe for rotation on the axis of rotation of the heavenly body, a gear frame, an arm coupled to said shaft and supporting said gear frame, satellite drive means carried by said frame for independent rotation and having an axis of rotation aligned with the pole and axis of rotation of the satellite, a bead representative of the satellite, a satellite support arm coupling said satellite drive means to said satellite whereby said satellite is rotatable with said drive means in a path adjacent the outer surface of the globe and in a plane perpendicular to said shaft, means coupled to said satellite drive means for translating the axis of rotation thereof into a direction different than the axis of rotation of said drive means, means driven by said motion translating means and coupled to said globe for rotating the globe on its axis of rotation in response to movements of the satellite bead relative the globe.

<center>No references cited.</center>